United States Patent [19]

Klein

[11] 4,313,566

[45] Feb. 2, 1982

[54] FLUID BALANCING SYSTEM FOR TANK VEHICLE

[76] Inventor: Richard F. Klein, 20911 Via Verde, Covina, Calif. 91722

[21] Appl. No.: 169,761

[22] Filed: Jul. 17, 1980

Related U.S. Application Data

[63] Continuation of Ser. No. 44,850, Jun. 4, 1979, abandoned.

[51] Int. Cl.³ .................... A01G 25/09; E01C 19/16; E01H 3/02
[52] U.S. Cl. .................................. 239/172; 137/255; 137/399; 137/412; 222/66; 222/136
[58] Field of Search ............... 222/66, 67, 136, 626; 280/5 D, 5 E; 137/40, 44, 255, 265, 351, 399, 412; 239/1, 11, 146, 170, 172, 302; 251/305

[56] References Cited

U.S. PATENT DOCUMENTS 873,680 12/1907 Pearse ........................... 239/170 X
1,960,831 5/1934 Shand ............................. 137/351 X Primary Examiner—Andres Kashnikow
Attorney, Agent, or Firm—Albert L. Gabriel

[57] ABSTRACT

A spray tanker suitable for balanced operation while traveling on level, uphill or downhill grades having a vehicle body and a tank body supported thereon. The tank body comprises a forwardly and rearwardly positioned tank section for containment of the fluid and conduits connecting each section to fluid spray apparatus for spraying fluid onto the grade traveled by the tanker. Valve structure connected to the fluid conduits connects either one or the other of the tank sections to the spray apparatus and the valve structure is operable for connecting the rearwardly positioned tank section to the spray apparatus when the vehicle is moving on an uphill grade and for connecting the forwardly positioned tank section to the spray apparatus when the vehicle is moving on a downhill grade.

9 Claims, 10 Drawing Figures

FLUID BALANCING SYSTEM FOR TANK VEHICLE

This is a continuation of application Ser. No. 044,850, filed June 4, 1979, now abandoned.

BACKGROUND OF THE INVENTION

1. Field of the Invention

The invention is in the field of fluid spray tank vehicle constructions.

2. Description of the Prior Art

It has long been appreciated that water spray tankers can provide an effective means for dust control in sites of construction, building demolition, excavation and mining operations. Most typically, a tanker vehicle is provided with a plurality of spray nozzles positioned on either the forward or rearward sections of the vehicle to provide a fluid spray or mist for particle entrapment and retention on the ground, thus generally lowering the overall particulate content in the air. Most typically the fluid is simply water. Substantial reduction of dirt and dust content in the air is particularly important under present environmental standards wherein an increased awareness of the health hazards resulting from such particulate matter has been brought to the level of public concern and governmental regulations.

Representative teachings of such tank vehicles are shown, for example, in U.S. Pat. No. 2,033,457 to Davis, Jr., U.S. Pat. No. 1,341,215 to Kramer, and U.S. Pat. No. 1,060,423 to Boxell. These patents generally teach various tank constructions including the concept of having separate compartments within the tank vehicle for fluid containment. These patents, however, do not address themselves to the particular problems of weight balancing which arises from present day mining and construction operations wherein the tank vehicle is typically operated at steep uphill and downhill grades. An inclination of 15°–30° is not uncommon. With such steep grades particular problems arise as to the weight distribution of the fluid contained in the tanker which directly affects the proper operation of the tanker.

SUMMARY OF THE INVENTION

It is therefore an object of the invention to provide a balanced fluid tanker for use in mining and construction sites which may have relatively steep grades.

A further object of the invention is to provide a spray tanker having a plurality of compartments which may be selectively connected to fluid spray means for maintaining a proper balance of the tank vehicle during level, uphill or downhill operation. Most preferably, the vehicle utilizes valve means operable either manually or automatically to selectively connect one of several separate fluid containment chambers within the tank body. The tank body may comprise, for example, a forwardly positioned chamber and a rearwardly positioned chamber with the forward chamber positioned to provide a center of gravity substantially forward of the rearmost axle of the vehicle and a rear chamber positioned generally to provide a center of gravity for its chamber substantially closer to the rearmost axle of the vehicle. The overall center of gravity of the tank vehicle may thus be adjusted by selectively drawing the spray fluid from either the rearward chamber or the forward chamber depending, respectively, upon the uphill or downhill motion of the vehicle. For example, during uphill motion of the vehicle fluid is withdrawn from the rearwardly positioned chamber in order to keep the center of gravity of the vehicle toward the front axle thereby preventing the vehicle from rearing up and possibly overloading the rear axle.

Proper balancing of the fluid within the tank vehicle is extremely important in maintaining proper operation of the tanker as well as in aiding in reduction of deterioration of the grade on which the vehicle travels. Roadway deterioration is a common hazard in construction sites inasmuch as the roadways are generally dirt grades provided for temporary use by construction vehicles. In mining operations vehicles are loaded with mine ores and thus the roadways are expected to carry heavy loads. However, these roadway grades are generally uneven and subject to substantial wear and tear by the movement of heavily loaded vehicles which may cause numerous potholes and general road deterioration. Tanker vehicles operating on such roadways to reduce particulate matter suspended in the air are necessarily subject to generally bad roadway conditions which make it extremely important for the tanker to maintain a well balanced load in traveling thereon. Further, inasmuch as the tanker vehicle provides a fluid spray on the roadway it is important that the vehicle be able to move with an approximately uniform speed which is not possible unless the center of gravity of the fluid is appropriately positioned between the axles of the vehicle to prevent wheel slipping, front axle lifting and the like. Variations in the speed of travel quickly produce uneven spray and puddles. These puddles in turn add to the road deterioration and make it even more difficult for tanker and construction vehicle travel along the roadway.

In accordance with the principles of the invention a spray tanker is provided which is suitable for a balanced operation along such roadways in traveling on level, uphill or downhill grades. The tanker has a vehicle body and comprises a multichambered tank body supported on the vehicle body. The tank body generally has a forwardly positioned section or chamber and a rearwardly positioned section or chamber for fluid containment. Spray means are provided for spraying fluid onto the grade traveled by the tanker and fluid conduit means connect the forward and rearward sections of the tank body to the fluid spray means. Valve means connected to the fluid conduit means permit fluid transport in a selected manner either from the forward or rearward tank section to the spray means of the tanker. Either manual or automatic means are provided for operating the valve means so that the rearwardly positioned section of the tank body is connected to the spray means when the vehicle is moving on an uphill grade and the forwardly positioned section of the tank body is connected to the spray means when the vehicle is moving in a downhill grade. With such a construction, the tank body is maintained balanced on the vehicle body thus permitting effective and uniform fluid spray during both uphill and downhill travel of the tanker.

BRIEF DESCRIPTION OF THE DRAWINGS

These and other objects of the invention will become more apparent in reference to the following specification and drawings wherein.

DETAILED DESCRIPTION OF THE PREFERRED EMBODIMENT

Figure 1:
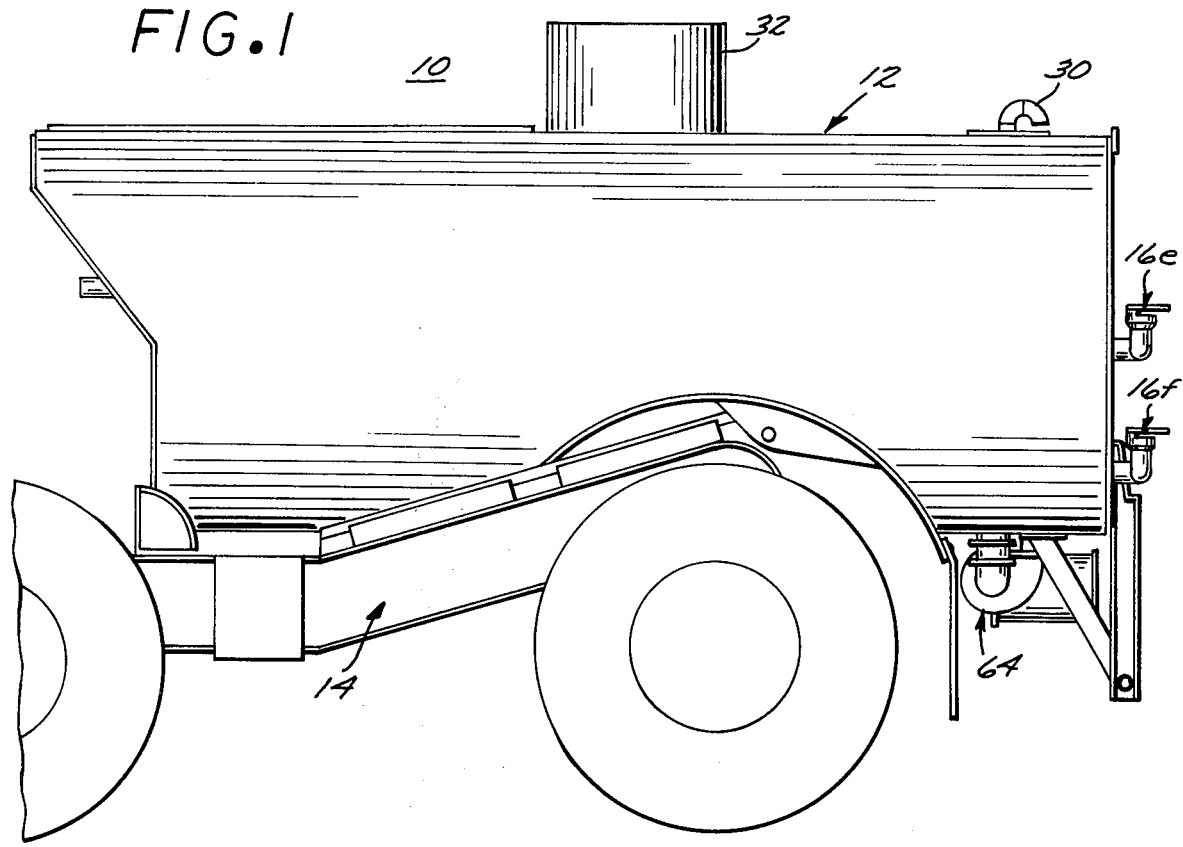
FIG. 1 is a partial side view of the tanker showing the tank body mounted on the vehicle body.
Figure 2:
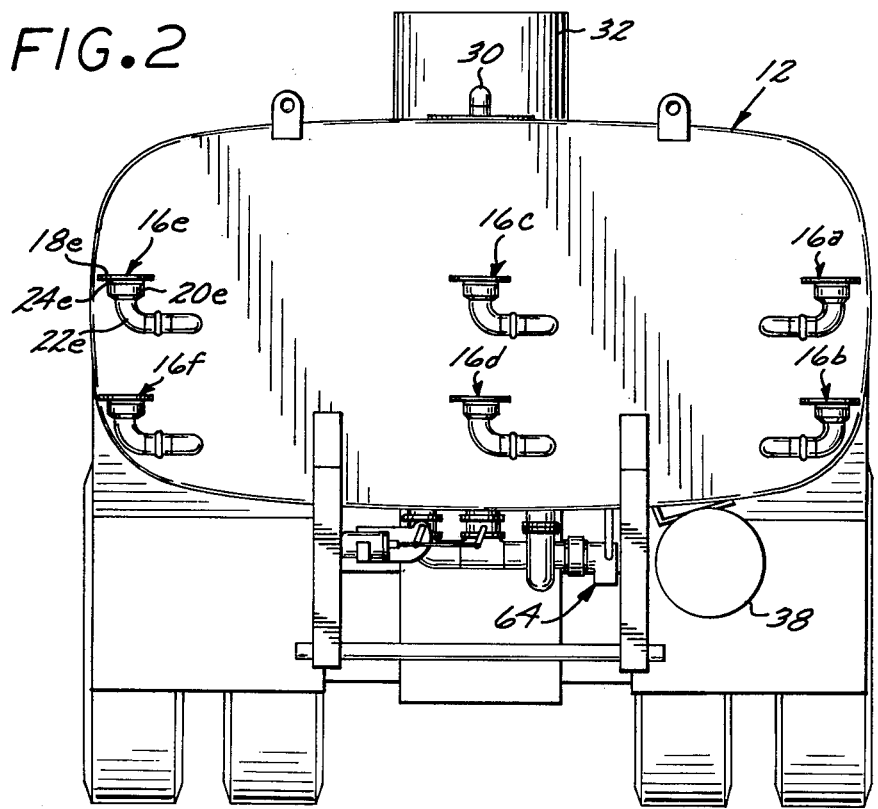
FIG. 2 is a rear view of the tanker of FIG. 1.

As illustrated in FIG. 1, the tanker 10 comprises a tank body 12 mounted on a vehicle frame or vehicle body 14. Attached to the tank body is provided a plurality of fluid spray means 16a–16f best illustrated in FIG. 2. As shown in reference to the fluid spray means 16e, each fluid spray means comprises a horizontally disposed end plate shown at 18e secured to a discharge port 20e of feed pipe 22e. A portion of the discharge port 20e is provided with a slit indicated at 24e which is cut generally horizontally and positioned parallel to the end plate 18e. Although FIG. 2 illustrates six fluid spray means 16a–16f, it is understood that a greater or lesser number of spray means may be mounted on the tank body depending upon the particular use of the tanker. Further, although the fluid spray means are illustrated as being secured to the rear portion of the tank body, such spray means may alternatively or additionally be provided on the front of the tanker or on the sides thereof. Further it is clear that even though six spray means are physically provided on the tanker as shown in FIG. 2, only one or several of these spray means may in fact be utilized at any given time. Thus, if low humidity conditions call for a high volume of fluid spray, all six of the spray means may be utilized whereas under high humidity conditions, less than six of the spray means would be required to maintain proper roadway moisture.

The tanker 10 is also provided with a conventional filling/vent port 30 and entry port 32 generally large enough to permit operator entry for service and repair purposes. An air tank 38 shown in FIG. 2 is also provided with appropriate feed conduits (not shown) for controlling the various air actuated valves utilized in the tanker.

Figure 3:
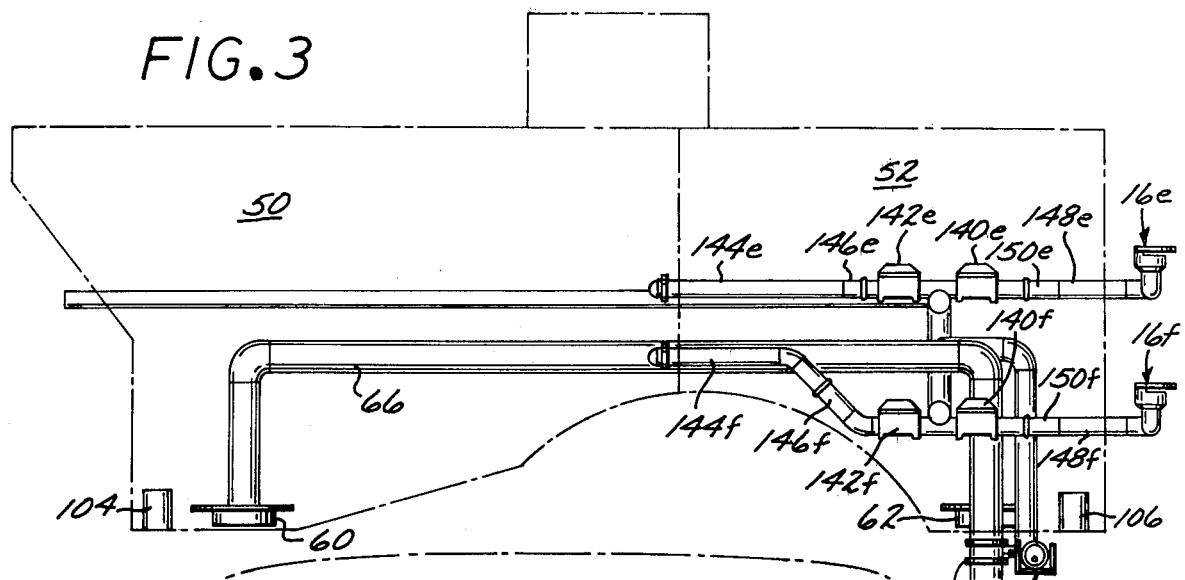
FIG. 3 is a side view of the tanker of FIG. 1 with the outer tank shell shown in phantom lines for illustrating elements inside the tank shell.
Figure 4:
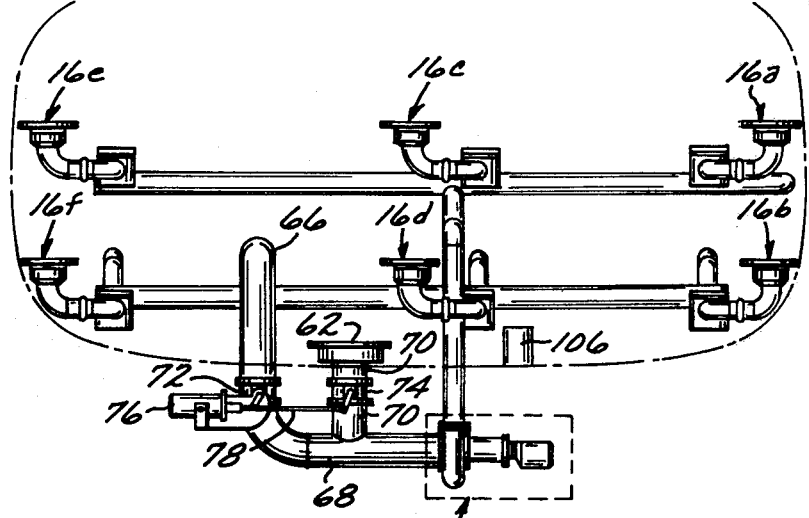
FIG. 4 is a rear view of the tanker similar to that of FIG. 2 with the tank shell shown in phantom lines to illustrate the elements interior of the tank shell.
Figure 5:
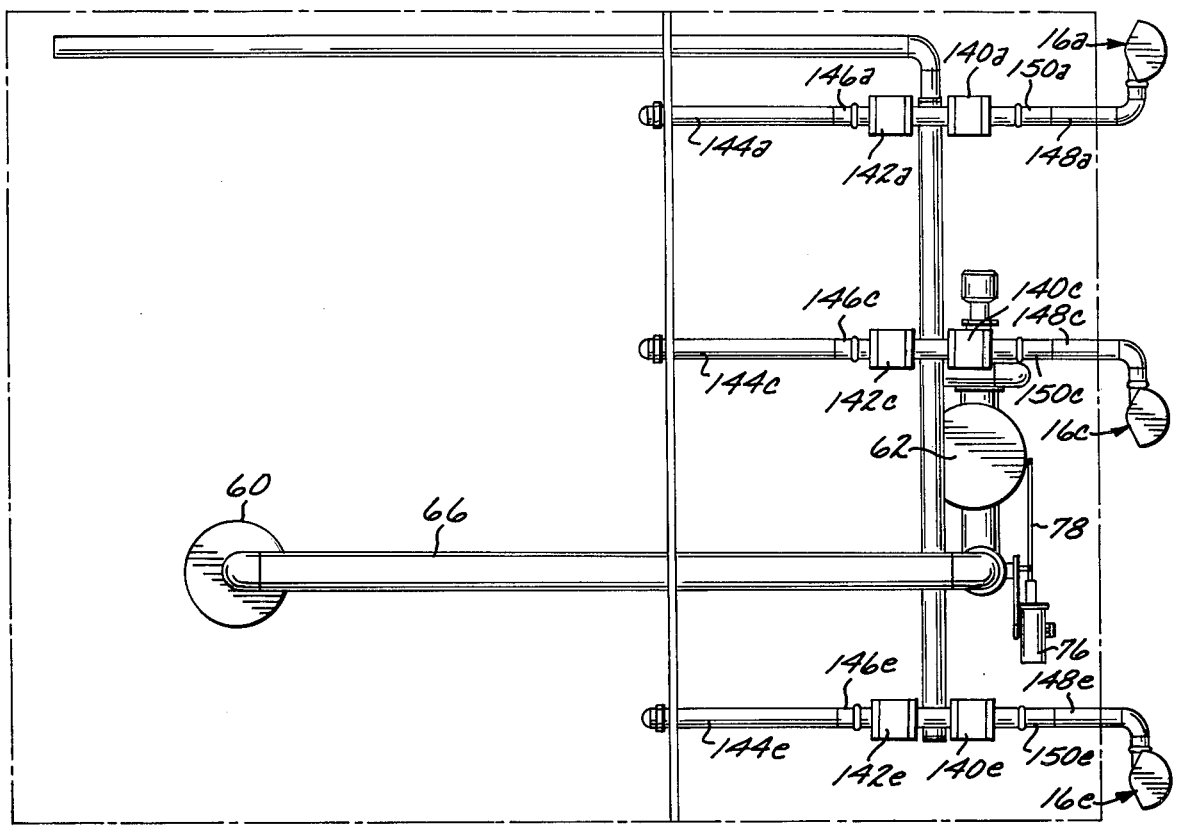
FIG. 5 is a top view of the tanker of FIG. 1 with the tank shell shown in phantom lines to illustrate the elements interior of the tanker.

FIGS. 3 and 4 illustrate views similar to those shown in FIGS. 1 and 2 respectively, but only illustrating the tank body 12 in phantom so as to permit illustration of the elements interior thereto. For clarity of illustration, the vehicle body 14 is not illustrated in FIGS. 3 and 4. Further, FIG. 5 is a top view of the tanker of FIG. 3 again showing the tank body 12 in phantom lines for permitting illustration of the elements interior thereto. In reference to FIGS. 3–5, it may be seen that the tank body comprises a first chamber or section 50 and a second chamber or section 52. The first chamber 50 is positioned forwardly of the second chamber 52 such that, when filled with fluid, its center of gravity is substantially forward of the rearmost axle of the tanker. Tank section 52 provides a center of gravity of the vehicle which is substantially closer to the rearmost axle of the tanker and may, depending upon the particular tanker utilized, provide a center of gravity in front, aligned with or in back of the rearmost axle of the tanker. Most preferably, the center of gravity of the rearmost tank section 52 is positioned slightly in front of the rearmost axle of the vehicle body 14.

The tank sections 50 and 52 are separated by means of a fluid-impervious partition 54 as best illustrated in FIGS. 3 and 5. The partition may be a partial partition as shown in the figures thereby permitting fluid communication between chambers 50 and 52 only when at least one chamber is substantially full. Optionally, partition 54 may extend to the top of the tank body 12 thereby completely separating tank sections 50 and 52. In either case, the tank sections 50 and 52 may be filled by means of the filling/vent port 30 as well as the entry port 32 or additionally provided filling ports (not shown).

Chamber 50 is provided with a sump pickup 60, and chamber 52 is provided with a sump pickup 62. As shown in FIG. 4, pickup 60 is connected to a centrifugal pump 64 by means of conduits 66 and 68. A conduit 70 connects the sump pickup 62 to conduit 68 and thus to the pump 64. Positioned within the conduits 66 and 70 are valve means 72 and 74, respectively, actuated by an air piston mechanism 76. Valve means 72 and 74 may each comprise conventional butterfly valves which may be opened and closed by means of the air piston mechanism 76. Although separate air piston mechanisms may be provided for each valve means 72 and 74, in the preferred embodiment, a single air piston mechanism 76 controls both valve means simultaneously, permitting valve means 72 to open while valve means 74 is closing and vice versa. Simultaneous control is provided by means of a connecting rod 78 which forms a common link connecting the butterfly valves to the driving mechanism of the air piston. The air piston mechanism 76 is spring loaded and normally biased so that the connecting rod 78 is in its left-most position thereby closing valve means 72 and opening valve means 74. In this configuration, pump 64 is utilized to withdraw fluid from the rear mounted tank chamber 52 and provides same to the fluid spray means 16a–16f. When the air piston mechanism 76 is actuated, the piston is urged against the spring bias by means of air pressure such that the connecting rod 78 is in its rightmost position thereby opening valve means 72 and closing valve means 74. In this mode of operation, the pump 64 is utilized to withdraw fluid from the forwardly mounted tank section 50 and provides same to the fluid spray means 16a–16f. A particular advantage in utilizing connection means to provide common control for opening and closing the valve means 72 and 74 is to eliminate any cavitation of the pump 64 which might otherwise develop due to time delays in switching from one tank section to the other. Thus, the common linkage between the valve means 72 and 74 eliminates any need for priming of the pump 64 and permits efficient switchover without interruption of spray discharge.

Figure 6:
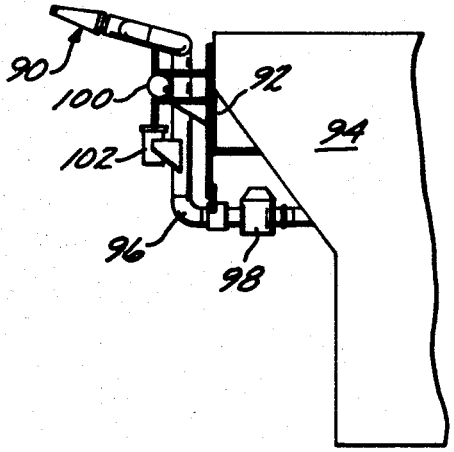
FIG. 6 is a side view of a turret which may be utilized on the tanker.

FIG. 6 illustrates a turret 90 which may be positioned on a support 92 connected to a section 94 of the tank body 12. Turret 92 is utilized to generate a high pressure fluid stream and is connected to either tank section 50 or 52 by means of a conduit 96 and valve means 98. The direction of the turret 90 may be automatically controlled by means of horizontally and vertically disposed air piston mechanisms 100 and 102, respectively. It is understood that additional turrets may be positioned as desired on various portions of the tank body 12.

Figure 7:
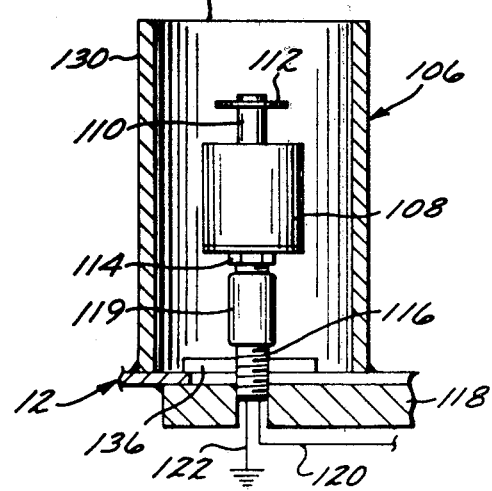
FIG. 7 is a cross-sectional view of a fluid level sensing means which may be utilized in the tanker.

Although the operation of the air piston mechanism 76 of FIG. 4 may be manually controlled at will by the operator, it is generally desirable to provide fluid level sensing means in the tank sections in order to provide some positive indication to the operator as to the fluid available in one or both tank sections. For this purpose, fluid level sensing means 104 and 106 are positioned at the lower portions of tank sections 50 and 52 respectively. Fluid level sensing means 104 and 106 may be identical, and the construction of fluid level sensing means 106 is shown in detail in FIG. 7.

The fluid level sensing means, or float switch, 106 is seen to comprise a float means 108 which is buoyant with respect to the fluid held in chambers 50 and 52. Float means 108 is positioned for vertical movement on a support rod 110 having an end stop secured at the upper extreme end thereof. The lower end of support rod 110 is fixed to the switch base 114. The float switch 106 is mounted by means of a pipe nipple 116 that is threadedly engaged in a base plate 118 attached to the floor of tank body 12, the switch base 114 being connected to the pipe nipple 116 by means of a tubular coupling 119. Leads 120 and 122 extend from switch base 114 out through coupling 119 and pipe nipple 116. Lead 120 is connected to a power source (FIGS. 8–10) and lead 122 is grounded. Float switch 106 serves to close the circuit between leads 120 and 122 when the float means 108 is positioned in its lowermost vertical position in response to a low level of fluid in the tank chamber.

The float means 108 as well as the rod support 110 are positioned within a splash guard in the form of a cylindrical shell 130 which is open at its upper end 132 to permit fluid entry. The upper end 132 of the cylindrical shell 130 is preferably disposed above the position of the end stop 112. Further, the lower end 134 of cylindrical shell 130 is provided with an aperture 136 in the form of a slit which acts as a weep hole or baffle. Thus, aperture 136 permits fluid communication with the fluid in the tanker even when the fluid level is below the upper end 132 of cylindrical shell 130. However, the cylindrical shell 130 has been found extremely advantageous in preventing premature operation of the float valve in response to fluid surges particularly when the fluid level is relatively low. In this manner, fluid surges resulting from the operation of the vehicle on uneven roads will not be effective to prematurely indicate a switchover condition from one tank section to the next. As a result a more long term float sensing indication mechanism is provided.

It may be seen that the fluid level sensing means 104 and 106 may be positioned in the tank sections 50 and 52 as shown in FIGS. 3, 4 and 5. Obviously, other positions of the sensing means may also be utilized. Further, it is possible to utilize only a single fluid level sensing means when the tanker is operated exclusively or primarily in a single steep grade type of operation. For example, if the tanker is to be utilized on level and uphill grades, then a single fluid level sensing means may be provided in the rearmost tank section 52. Conversely, if the tanker is to be utilized on level and downhill grades, then a single fluid level sensing means may be employed in the forward chamber 50. Most preferably, however, a fluid level sensing means is provided in each tank section.

Also illustrated in FIGS. 3–5 are a plurality of valve means 140a–f and 142a–f. The letters a-f correspond to the letters of the fluid spray means 16a–16f, respectively. Further, valve means designated by the numeral 140 are connected in the fluid communication path from the pump 64 to the fluid spray means 16 whereas valve means 142 are connected in the fluid communication path from the pump 64 to the interior of the tank body 12, as for example connected to the interior of the chamber 50 shown in FIGS. 3 and 5. In this manner, the valve means 140 may be designated discharge valves since they are in the discharge path of the fluid spray means 16 whereas the valve means 142 may be designated recirculating valves since they are in the recirculating path of fluid flow. For example, if fluid is to be discharged by the fluid spray means 16a, then valve means 140a is opened whereas the valve means 142a is closed. Alternately, if fluid is not to be discharged through the fluid spray means 16a then the discharge valve means 140a is closed whereas the recirculating valve means 142a is opened. Recirculating connection conduits 144a–f are provided connecting the valve means 142 to the interior of the tank section to which fluid is to be recirculated. Most preferably, these recirculating conduits 144a–f have at least a section thereof designated 146 which is flexible so as to permit easy removal of valve means 142 for service or replacement thereof. Similarly, connecting conduits 148a–f are provided between the discharge valve means 140 and the fluid spray means 16. Flexible sections 150a–f are provided as part of the discharge connecting conduits 148 in order to permit easy removal of the valve means 140 for service and replacement thereof.

Figure 8:
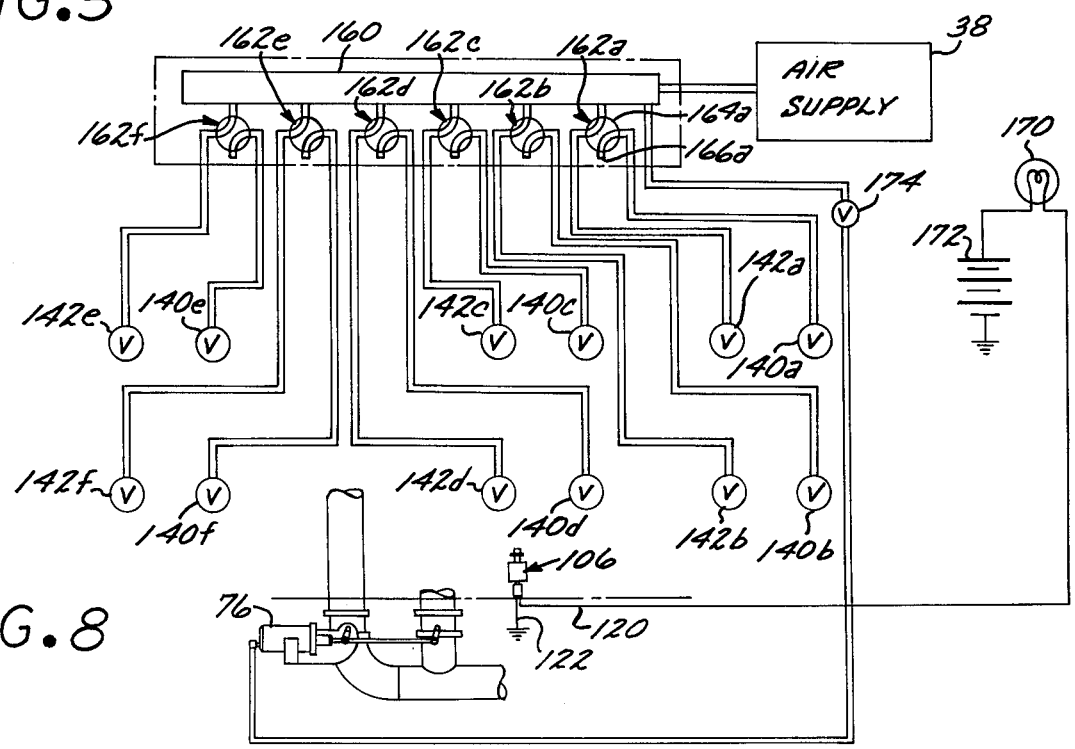
FIG. 8 is a diagram of one embodiment of the valve control mechanism of the invention wherein a manual mode of operation is provided.
Figure 9:
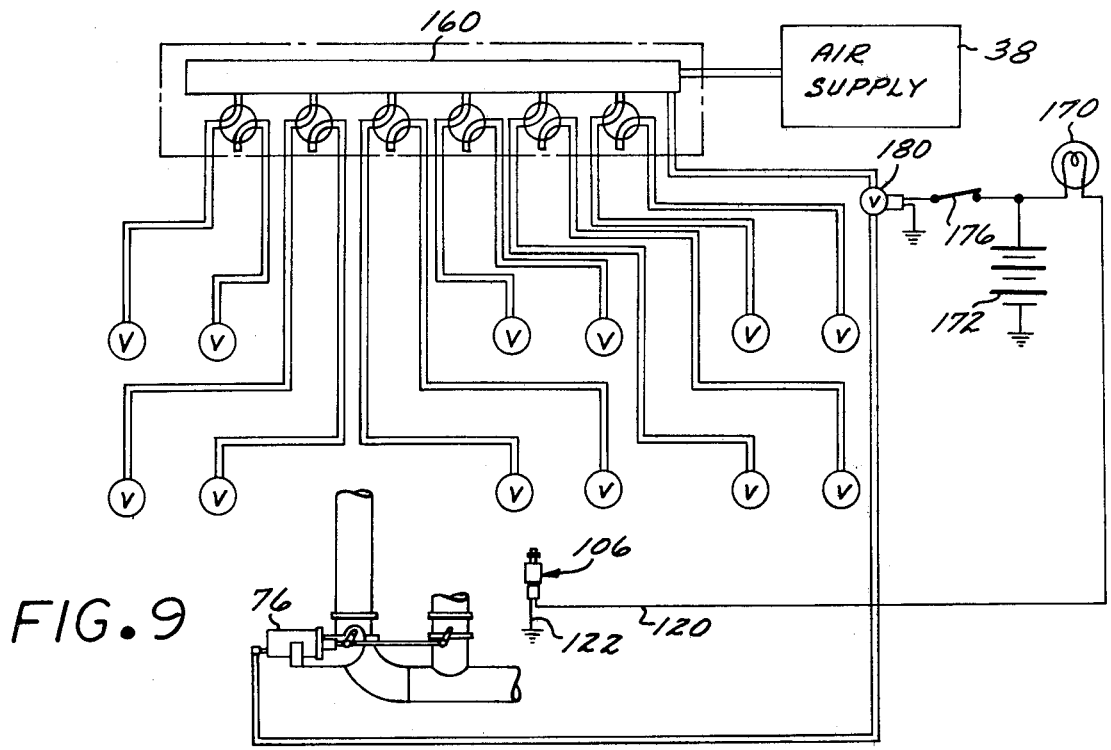
FIG. 9 is a diagram of a second embodiment of the valve control mechanism of the invention wherein a semiautomatic mode of operation is provided.
Figure 10:
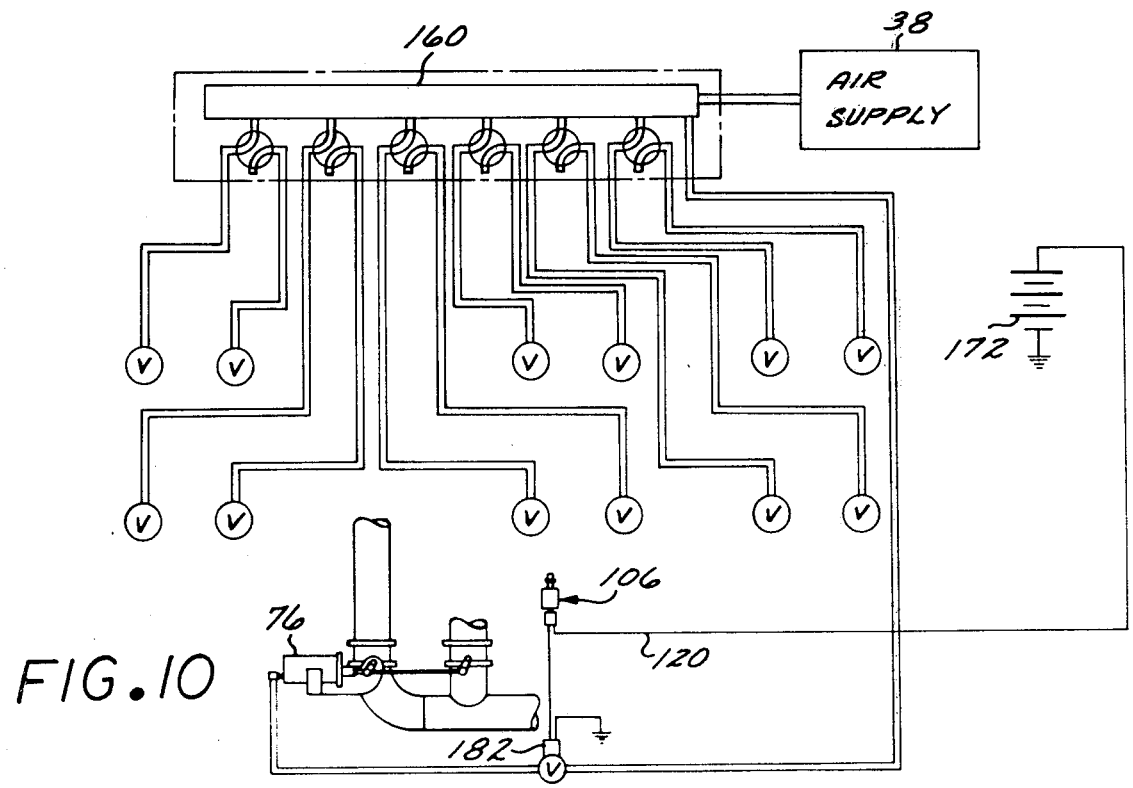
FIG. 10 is a diagram of a third embodiment of the valve control mechanism wherein an automatic mode of operation is provided.

The operation of the valve control mechanism is illustrated in FIGS. 8–10. As shown in FIG. 8, air is supplied by means of the air tank 38 to an air manifold 160 which in turn is connected to a plurality of manually operable control valves 162a–f located in the cab of the vehicle. Control valve 162a is utilized to control valves 140a and 142a. The control valve is provided with a rotating connecting section 164a which rotates by 90° for connection to either valve means 140a or its corresponding valve 142a. Upon rotation of the rotating connecting section 164a, one of the two valve means 140a and 142a is connected to the air manifold 160 while the other valve means is fed to a relief port 166a. It is understood that there are a plurality of rotating connecting sections 164a–f as well as a plurality of relief ports 166a–f wherein the letters a–f are utilized for designating correspondence to the valves 140a–f, 142a–f and fluid spray means 16a–f. For example, the position illustrated in FIGS. 8–10 of the rotating connecting sections 164 is such as to provide air pressure from the air supply 38 through the manifold 160 and to the valve means 142. Air pressure to valve means 142 is effective for closing the valve means 142. Valve means 140, however, remains open, and thus fluid is pumped through the open valve means 140 to the fluid spray means 16. Rotation of the connecting sections 164 by 90° applies pressure to the discharge valve means 140 thereby closing same and simultaneously venting the valve means 142 through the relief port 166. In this manner, fluid is pumped through the valve means 142 thereby recirculating the fluid into the tank 12.

Also shown in FIG. 8 is the fluid level sensing means 106 and the leads 120 and 122. Lead 120 is shown connected to an indicator 170 in the form of a light bulb which in turn is connected to a battery 172. The battery 172 may typically be the vehicle battery. Actuation of the fluid level sensing means 106 thereby closes the circuit between the conducting leads 120 and 122 and energizes the indicator 170. Indicator 170 is preferably positioned at a convenient point within the cab of the vehicle, and thereby provides an indication to the operator of the vehicle that the fluid is low in one of the fluid chambers of the tank body 12. If plural fluid level sensing means are employed, then indicia adjacent the bulbs or even different colored bulbs may be utilized to readily provide an indication as to which tank section is substantially empty. Upon viewing the indicator 170, the operator may open or close valve means 174 which is connected to the air piston mechanism 76 described previously in connection with FIG. 4. In effect, the opening and closing of the valve means 174 permits the switchover from one tank section to the other.

As an alternative to the manual system shown in FIG. 8, a semiautomatic mechanism may be provided as shown in FIG. 9 wherein the operator merely has to depress a switch 176 interconnecting the battery 172 to a solenoid-actuated valve means 180. The invention may also be practiced in reference to FIG. 10 wherein a fully automatic system is shown. Closure of the circuit containing the fluid level sensing means 106 automatically energizes a solenoid-actuated valve means 182 which is interconnected in the supply line from the air manifold 160 to the air piston mechanism 76 thereby automatically effecting changeover from one tank section to the other. Further, a manual override may be provided to the fully automatic system of FIG. 10 as well as other types of manual/automatic embodiments.

Although the invention has been described in reference to specific embodiments, it is understood that various modifications and improvements may be made by those of skill in the art, and it is intended that the claims cover all such modifications and improvements which fall within the spirit and scope of the invention.

I claim:

1. A fluid spray tanker suitable for balanced operation while traveling on a grade, the tanker having a vehicle body comprising:
    (a) a tank body supported on said vehicle body and having a forwardly positioned section and a rearwardly positioned section, each section providing a containment for said fluid,
    (b) fluid spray means for spraying said fluid onto said grade traveled by said tanker,
    (c) fluid conduit means connecting said forwardly positioned section and said rearwardly positioned section to said fluid spray means,
    (d) valve means connected to said fluid conduit means for selectively connecting said forwardly and rearwardly positioned sections to said spray means,
    (e) means for connecting said rearwardly positioned section to said spray means when said vehicle is moving on an uphill grade, and
    (f) means for detecting the level of fluid in said rearwardly positioned section and means for operating said valve means for connecting said forwardly positioned section to said spray means when said tanker is traveling on an uphill grade and upon detection of a low level of fluid in said rearwardly positioned section.

2. A fluid spray tanker suitable for balanced operation while traveling on a grade, the tanker having a vehicle body comprising:
    (a) a tank body supported on said vehicle body and having a forwardly positioned section and a rearwardly positioned section, each section providing a containment for said fluid,
    (b) fluid spray means for spraying said fluid onto said grade traveled by said tanker,
    (c) fluid conduit means connecting said forwardly positioned section and said rearwardly positioned section to said fluid spray means,
    (d) valve means connected to said fluid conduit means for selectively connecting said forwardly and rearwardly positioned sections to said spray means,
    (e) means for connecting said forwardly positioned section to said spray means when said vehicle is moving on a downhill grade, and
    (f) means for detecting the level of fluid in said forwardly positioned section and means for operating said valve means for connecting said rearwardly positioned section to said spray means when said tanker is traveling on a downhill grade and upon detection of a low level of fluid in said forwardly positioned section.

3. A spray tanker as recited in claim 1 or 2 wherein said fluid level detecting means comprises float switch means.

4. A spray tanker as recited in claim 1 or 2 wherein said fluid level detecting means comprises:
    (a) support means,
    (b) float means secured to said support means for generally vertical movement in response to fluid level, said float means having a highest and lowest position in response to fluid level,
    (c) a cylindrical shell substantially surrounding said float means,
    (d) said shell being open at the top thereof for fluid communication with said tank body,
    (e) said shell having an opening near the bottom thereof for providing a restricted path of fluid communication with said tank body, and
    (f) a switch means actuable by said float means upon obtaining its lowest position.

5. A fluid spray tanker suitable for balanced operation while traveling on a grade, the tanker having a vehicle body comprising:
    (a) a tank body supported on said vehicle body and having a forwardly positioned section and a rearwardly positioned section, each section providing a containment for said fluid,
    (b) fluid spray means for spraying said fluid onto said grade traveled by the tanker,
    (c) fluid conduit means connecting said forwardly positioned section and said rearwardly positioned section to said fluid spray means, and
    (d) valve means connected to said fluid conduit means for selectively connecting said forwardly and rearwardly positioned sections to said spray means, said valve means comprising means for substantially simultaneously connecting one of said forwardly and rearwardly positioned sections to said fluid spray means and disconnecting the other section from said fluid spray means.

6. A spray tanker as recited in claim 5 wherein said valve means further comprises a first valve connecting said forwardly positioned section to said fluid spray means and a second valve connecting said rearwardly positioned section to said fluid spray means and said connecting and disconnecting means comprises a mechanical link connected to said first and second valves for substantially simultaneously opening one of said first and second valves while closing the other valve.

7. A spray tanker as recited in claim 6 wherein said first and second valves are butterfly valves and said mechanical link comprises a connecting rod.

8. A spray tanker as recited in claim 7 wherein said means for operating said valve means comprises an air actuated piston connected to said connecting rod for moving same.

9. A fluid spray tank vehicle comprising:
(a) a tank having first and second fluid containment means, said first containment means positioned forwardly of said second containment means on said vehicle,
(b) means for spraying fluid from said first and second containment means, said spraying means being attached to said tank,
(c) fluid transport means connecting said first and second containment means to said spraying means,
(d) valve means positioned in said transport means and operable in a first position for connecting said first containment means to said spray means while substantially blocking fluid communication between said second containment means and said spraying means, and operable in a second position for connecting said second containment means to said spraying means while substantially blocking fluid communication between the first containment means and said spraying means,
(e) fluid level measurement means positioned at least in one of said first and second containment means, and
(f) means for operating said valve means between said first and second positions in response to a low fluid level measurement whereby said tank fluid may be balanced on said vehicle while operating the vehicle on level and inclined paths.

* * * * *